United States Patent
Naftali et al.

(10) Patent No.: US 7,512,970 B2
(45) Date of Patent: Mar. 31, 2009

(54) HOST CREDENTIALS AUTHORIZATION PROTOCOL

(75) Inventors: Amir Naftali, Tel-Aviv (IL); Eitan Fux, Tel Aviv (IL); Ilan Bronshtein, Rishon-LeZion (IL); Susan Thomson, Summit, NJ (US); Thomas Gary Howard, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 10/891,683

(22) Filed: Jul. 15, 2004

(65) Prior Publication Data

US 2006/0015724 A1  Jan. 19, 2006

(51) Int. Cl.
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| G06K 19/00 | (2006.01) |
| H04L 9/32 | (2006.01) |

(52) U.S. Cl. .......................... 726/4; 726/25
(58) Field of Classification Search ............... None
See application file for complete search history.

(56) References Cited

U.S. PATENT DOCUMENTS

| 6,523,027 | B1 | 2/2003 | Underwood | 707/4 |
| 6,601,233 | B1 | 7/2003 | Underwood | 717/102 |
| 6,609,128 | B1 | 8/2003 | Underwood | 707/10 |
| 6,633,878 | B1 | 10/2003 | Underwood | 707/100 |
| 6,704,873 | B1 | 3/2004 | Underwood | 713/201 |
| 6,718,535 | B1 | 4/2004 | Underwood | 717/101 |
| 6,769,000 | B1* | 7/2004 | Akhtar et al. | 707/103 R |
| 6,873,988 | B2* | 3/2005 | Herrmann et al. | 707/10 |
| 7,010,807 | B1* | 3/2006 | Yanovsky | 726/24 |
| 2001/0014908 | A1* | 8/2001 | Lo et al. | 709/203 |
| 2002/0199116 | A1* | 12/2002 | Hoene et al. | 713/201 |
| 2003/0074486 | A1 | 4/2003 | Anastasiadis et al. | |
| 2003/0226017 | A1* | 12/2003 | Palekar et al. | 713/168 |
| 2004/0103323 | A1* | 5/2004 | Dominic | 713/202 |
| 2004/0107360 | A1* | 6/2004 | Hermann et al. | 713/201 |
| 2005/0125693 | A1* | 6/2005 | Duplessis et al. | 713/201 |
| 2005/0163078 | A1* | 7/2005 | Oba et al. | 370/331 |

OTHER PUBLICATIONS

Rigney et al., RFC 2138—Remote Authentication Dial In User Service (RADIUS), Apr. 1997, Internet RFC/STD/FYI/BCP Archives, all pages.*
Anderson et al., Internet-Draft: Protected EAP Protocol (PEAP), Feb. 23, 2002, PPPEXT Working Group, all pages.*

* cited by examiner

*Primary Examiner*—Emmanuel L Moise
*Assistant Examiner*—Nadia Khoshnoodi
(74) *Attorney, Agent, or Firm*—BainwoodHuang

(57) ABSTRACT

A protocol, method, apparatus and computer program product for providing and utilizing a host credential authorization protocol (HCAP) is presented. The protocol is utilized by an AAA server and a posture validation server. The AAA server and the posture validation server are utilized to determine whether a host is allowed access to a device.

15 Claims, 8 Drawing Sheets

HOST CREDENTIALS AUTHORIZATION PROTOCOL

BACKGROUND

Authentication, authorization, and accounting (AAA) is an architectural framework used for providing secure access to network devices and resources. AAA is comprised of the three independent but related functions of authentication, authorization, and accounting.

Authentication is the process of identifying and authenticating a user. Within the AAA framework, authentication occurs when a user passes appropriate user credentials to an AAA server, and requests that the server authenticate the user. The AAA server will attempt to validate the credentials, and respond with either an accept or deny message. Remote users typically use AAA authentication to control access to a network device such as a router or Network Access Server (NAS), or to control access to network resources.

Authorization is used for permitting predefined rights or privileges to a user, group of users, system, or a process. Within the AAA framework, a client queries the AAA server to determine what actions a user is authorized to perform. The AAA server returns a set of attribute-value (AV) pairs that defines the user's authorization. The client is then responsible for enforcing user access control based on those AV pairs. AAA authorization is typically used to provide authorization for actions attempted while logged into a network device or to provide authorization for attempts to use network services.

Accounting is a method which records (or accounts) the who, what, when, and where of an action that has taken place. Accounting enables tracking of the services that users are accessing and the amount of resources they are consuming. This data can later be used for accountability, network management, billing, auditing, and reporting purposes. Within the AAA framework, the client sends accounting records that include accounting AV pairs to the AAA server for centralized storage. An accounting record is comprised of accounting AV pairs One protocol used for providing authentication services is Remote Access Dial-In User Service (RADIUS) protocol. The RADIUS protocol is a client/server protocol, wherein the client is typically Network Accessed Storage (NAS), a router or a switch, which requests a service such as authentication or authorization from the RADIUS server. When authorization information is needed by the client, the RADIUS server is queried by the client and passes the user credentials to the designated RADIUS server. The server then acts on the configuration information necessary for the client to deliver services to the user. A RADIUS server can also act as a proxy client to other RADIUS servers or other kinds of authentication servers.

Another protocol used for providing authentication services is known as Extensible Authentication Protocol (EAP). EAP is a general protocol for authentication that also supports multiple authentication methods. In wireless communications using EAP, a user requests connection to a wireless local area network (WLAN) through an access point (AP) which requests the identity of the user and transmits that identity to an authentication server such as a RADIUS server. The server asks the AP for proof of identity, which the AP gets from the user and then sends back to the server to complete the authentication.

Yet another protocol used for providing authentication services is known as Protected Extensible Authentication Protocol (PEAP). PEAP authenticates WLAN clients using server-side digital certificates by creating an encrypted tunnel between the client and the authentication server. The tunnel then protects the subsequent user authentication exchange.

SUMMARY

Conventional mechanisms such as those explained above suffer from a variety of problems or deficiencies. One such problem relates to conventional posture validation wherein a third party posture validation server provides vendor specific capabilities as part of an authentication session. In order to perform posture validation the external posture validation server communicates with an AAA server by way of a protocol. In one conventional approach this is accomplished by using existing technologies and proxying RADIUS messages to an external posture validation server. This forces the external posture validation server to implement a RADIUS server and an EAP authenticator for both PEAP and EAP.

In the conventional architecture the posture validation session is part of an entire authentication session between a host and an AAA server. An external posture validation server doesn't authenticate/authorize a host/user; it only provides posture validation results. This means that the AAA server needs to forward only the relevant portion of the authentication session to the external servers. The technologies in use include RADIUS, EAP-FAST, PEAP, and EAP-TLV, while the posture validation session is implemented using EAP-TLV, tunneled in either PEAP or EAP-FAST encapsulated in RADIUS.

This is problematic since the vendor is required to implement a full RADIUS and EAP authenticator (PEAP and EAP-TLV) server in order to perform posture validation. The RADIUS and EAP authenticators are major overheads and support much more then just posture validation.

Further, since posture validation is only one step in the entire authentication session, this means that the session has to be broken and the posture validation data has to be separated from authentication data. This causes the AAA server to function as a gateway and not just a RADIUS proxy.

Authentication protocols (e.g. EAP and RADIUS) used for authentication provide a Boolean result (yes/no, accept/reject) however the posture validation result may contain a set of evaluation results that are used by the AAA server when making a policy decision.

Embodiments of the invention significantly overcome such deficiencies and provide mechanisms and techniques that provide posture validation functionality between the AAA server and the external posture validation server. In a particular embodiment, a Host Credentials Authorization Protocol (HCAP) is used to provide the AAA server with a method to communicate with third party servers and validate posture data arriving from a host. The HCAP may include at least one version negotiation request message, at least one version negotiation response message, at least one posture validation request message, and at least one posture validation response message; although version negotiation is not mandatory.

In another embodiment a method for controlling access to a device includes receiving a request for access to the device from a host, forwarding the request for access from the device to a AAA server, initiating a posture validation session between the AAA server and a posture validation server utilizing the host credentials authorization protocol, determining whether to allow access by the host to the device by AAA server based on the result of the posture validation session, and when access is allowed then allowing access by the host to the device and when access is not allowed then disabling access by the host to the device.

Other embodiments include a computer readable medium having computer readable code thereon for providing a host credentials authorization protocol, the medium including instructions for receiving a request for access to the device from a host, instructions for forwarding the request for access from the device to a AAA server, instructions for initiating a posture validation session between the AAA server and a posture validation server, the posture validation session utilizing a host credentials authorization protocol (HCAP). The computer readable medium further includes instructions for determining whether to allow access by the host to the device by the AAA server based on a result from the posture validation session, and instructions for allowing access by the host to the device when access is allowed and instructions for disabling access by the host to the device when access is not allowed.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an attribute history as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a host credentials authorization protocol as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
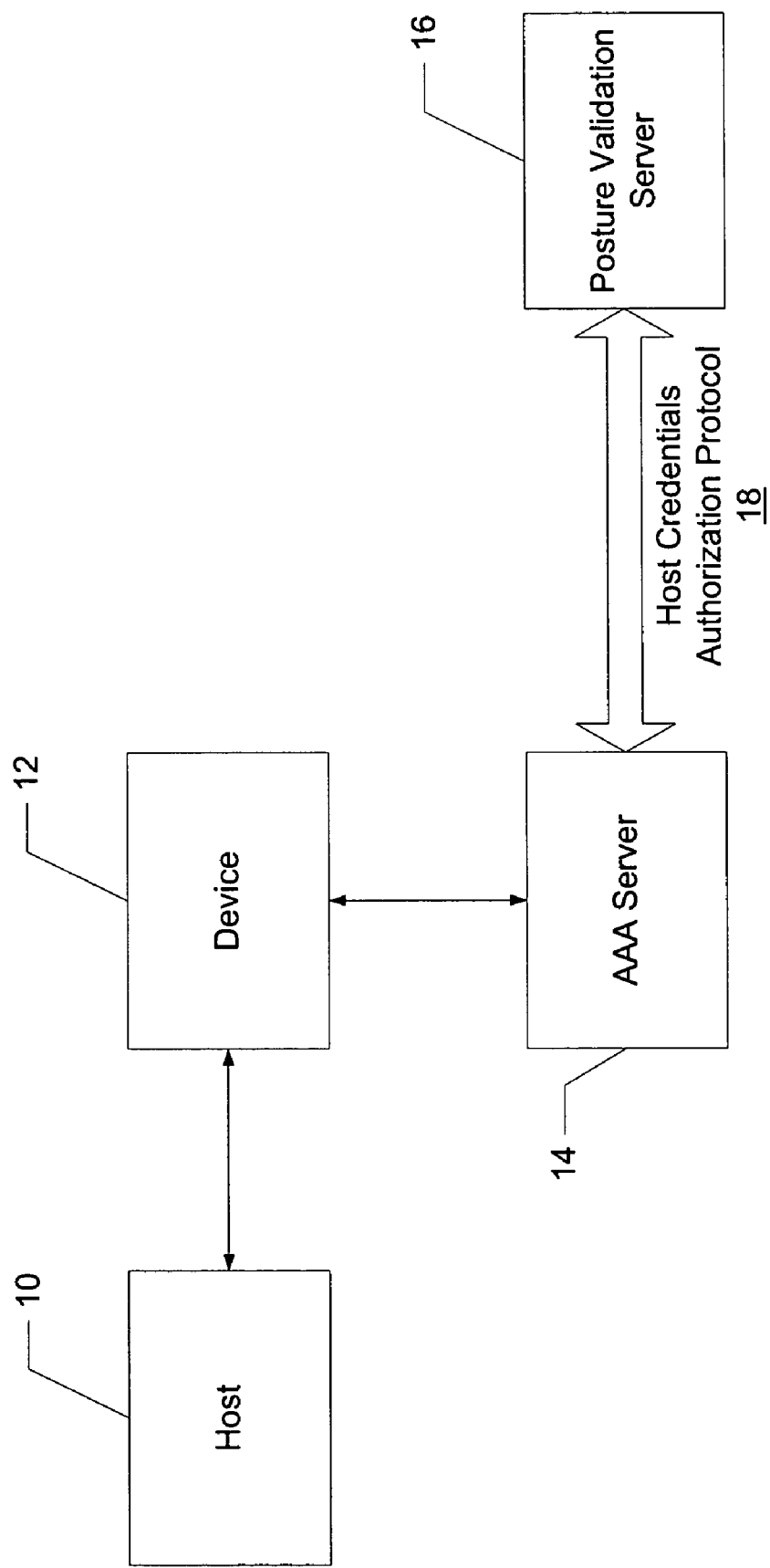
FIG. 1 is a block diagram of a system utilizing the present protocol.

A posture validation session between a first server (such as an AAA server) and a second server (such as a posture validation server (PVS)) takes place in order to provide vendor specific capabilities as part of an authentication session. The posture validation session between the AAA server and the posture validation server is accomplished utilizing a host credentials authorization protocol (HCAP). Referring now to FIG. 1, an environment for performing posture validation is shown. A host 10 requests access to device 12. Device 12 forwards the request to an AAA server 14. The AAA server 14 communicates with a posture validation server (PVS) 16 by way of the HCAP.

The AAA server 14 is a server program that handles user requests for access to computer resources and, for an enterprise, provides (AAA) services. The AAA server 14 typically interacts with network access and gateway servers and with databases and directories containing user information. The current standard by which devices or applications communicate with an AAA server is the Remote Authentication Dial-In User Service (RADIUS).

The PVS 16 is a server related to a particular application and is used for enforcement of a network access policy. As an example, the PVS may be realized as an anti-virus PVS and is used to implement anti-virus policies such as "Denial of access unless there was a successful scan in the last 48 hours based on anti-virus software from vendor XXX, version YYY".

In order to perform posture validation a HyperText Transfer Protocol (HTTP) connection is established between the AAA server and the posture validation server (PVS). The first step in performing posture validation, after the HTTP connection is established, is to perform version negotiation.

HCAP version negotiation is initiated by the AAA server. Version negotiation can be initiated by the AAA server at any time while the connection is open. The AAA server may send HCAP requests before performing version negotiation. The AAA server negotiates the version after the HTTP connection is established and before sending any other HCAP requests. The negotiated version is coupled with the connection until the next version negotiation is performed. The negotiated version is used in all request sent to the PVS. After the HCAP version negotiation is completed, the posture validation can take place.

The AAA server sends posture validation requests to the PVS and the PVS responds with posture validation responses. Each response is matched to a request using the Request ID field of the request (described in detail below). The Request ID is unique inside a single TCP connection. Both the AAA server and the PVS use the data field to send parameters relevant to the request or the response. Parameters are encapsulated as TLVs (Type, Length and Value frame). Each TLV can contain one or more parameters.

The following illustration describes the general format of an HCAP message. The format contains seven fields, defined below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     CODE      |          Request ID           |    Length     |
+-+-+-+-+-+-+-+-+-+-+-+-+-+-+-+-+-+-+-+-+-+-+-+-+-+-+-+-+-+-+-+-+
|     Type      |     Flags     |            Version            |
+-+-+-+-+-+-+-+-+-+-+-+-+-+-+-+-+-+-+-+-+-+-+-+-+-+-+-+-+-+-+-+-+
|                            Data ...                           |
+-+-+-+-+-+-+-+-+-+-+-+-+-+-+-+-+-+-+-+-+-+-+-+-+-+-+-+-+-+-+-+-+
```

The Code field comprises 8 bits, indicating the code of message. A code value of 0 is reserved. A code value of 1 indicates the present message is a request message. A code value of 2 indicates the present message is a response message.

The Request ID field comprises 16 bits, indicating the Identity of this message. This value is unique for each request. When a PVS responds to a request it must use the same identity taken from the request. The ID is unique within each connection.

The Length field comprises 16 bits, and indicates the overall number of octets (including the message header and data).

The Type field comprises 8 bits, indicating the message type. A type value of 1 indicates the present message is a version negotiation message type. A type value of 2 indicates the present message is a posture validation message type.

The Flags field comprises 8 bits and is reserved.

The Version field comprises 8 bits and defines the HCAP version to be used for this session.

The Data field stores the data transmitted as part of the HCAP message.

HCAP uses different message types (request or response). Each message type requests a different type of operation from the PVS. The first message type is a version negotiation message type.

The Request message type has the following format

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   code 0x01   |              ID               |    length     |
+-+-+-+-+-+-+-+-+-+-+-+-+-+-+-+-+-+-+-+-+-+-+-+-+-+-+-+-+-+-+-+-+
|    0x0008     |   type   0x01 |  f    0x00    |   ver   0x01  |
+-+-+-+-+-+-+-+-+-+-+-+-+-+-+-+-+-+-+-+-+-+-+-+-+-+-+-+-+-+-+-+-+
```

The Response message type has the following format

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   code 0x02   |              ID               |    length     |
+-+-+-+-+-+-+-+-+-+-+-+-+-+-+-+-+-+-+-+-+-+-+-+-+-+-+-+-+-+-+-+-+
|    0x0008     |   type   0x01 |  f    0x00    |   ver   0x??  |
+-+-+-+-+-+-+-+-+-+-+-+-+-+-+-+-+-+-+-+-+-+-+-+-+-+-+-+-+-+-+-+-+
```

The sequence of messages comprising a Version negotiation is as follows. The AAA server sends a version negotiation request message. The AAA server sets the version field of the message to the highest supported HCAP version number. The PVS responds back with a version negotiation response message. If the PVS supports the requested version, the PVS sets the version field of the message to the version number that was sent by the AAA server. If the PVS doesn't support the requested version, the PVS responds with the highest version supported by the PVS. If the AAA server supports the version proposed by the PVS in the version negotiation response message then all future messages are populated with the supported version. If the AAA server doesn't support the version proposed by the PVS the AAA server terminates the connection.

Once version negotiation is successful, posture validation can begin. Posture validation comprises posture validation request and response messages which are sent in order to validate posture data by the PVS. The AAA server includes a Vendor AppType Frame-Type Length Value (VAF-TLV) frame in the posture validation request. The PVS includes a Result-TLV in the posture validation response. The Result-TLV is the first TLV. When the PVS is able to process the request and can return a valid posture validation response, then the Result-TLV value is set to 0x01 (success) and a VAF-TLV must be included in the posture validation response. The VAF-TLV in the response contains the PVS posture validation response.

The Posture Validation Request format is

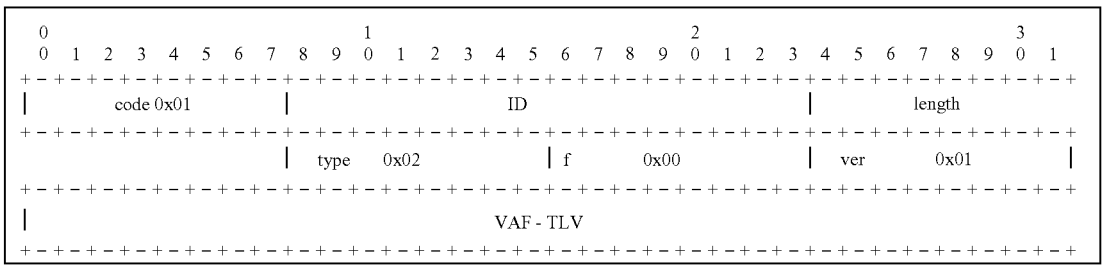

The Posture Validation Response format is

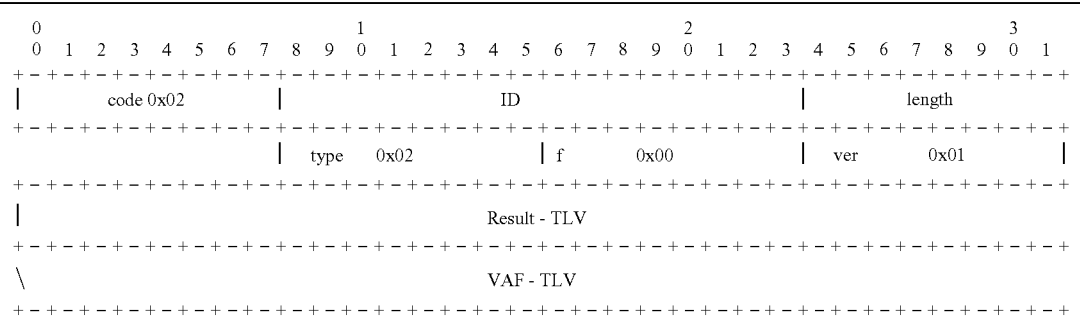

The posture validation response message contains at least one TLV. The TLV format comprises three fields.

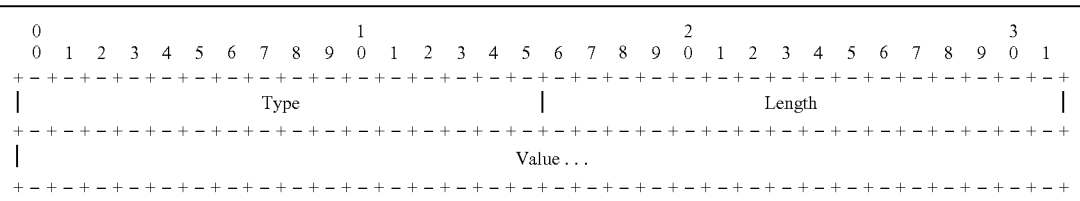

The Type field comprises 16 bits, and is used to indicating the message type. A type value of 0 is reserved. A type value of 1 indicates the present message is VAF-TLV posture data (in posture request/response messages). A type value of 2 indicates a result TLV.

The Length field comprises 16 bits, and is used to indicate the total number of octets including the TLV header and data.

The Value field comprises the data.

The VAF-TLV is used to pass VAF information from the AAA server to the PVS and from the PVS to the AAA server.

The VAF-TLV format includes a type field of 1, a length field indicating the total number of octets including the TLV header and data, and a value field including the Vendor-AppType frames.

The VAF-TLV is included in the posture validation request/response message. The TLV value contains one or more Vendor-AppType Frames (VAFs). A VAF may be empty VAF-TLV and at least one APT is present in the returned VAFs.

The AAA server follows the following processing rules. If the response has a Result-TLV with value set to 0x0001 and the VAF-TLV doesn't contain VAFs the AAA will fail the response. If the response has a Result-TLV with value set to 0x0001 and none of the VAF within the VAF-TLV contain an APT, the AAA server will fail the response. If the response has a Result-TLV with value not set to 0x0001 the AAA server will fail the response. If the response has a Result-TLV with value set to 0x0001 and at least one APT is present in the VAF that are within the VAF-TLV then the AAA server will consider the response as a valid response.

Vendor-AppType Frames(VAFs) are utilized to carry Attribute-Value Pairs (AVPs). The frame header describes the vendor ID and application type to which the AVPs within the frame belong to.

Vendor-AppType Frame format includes four fields.

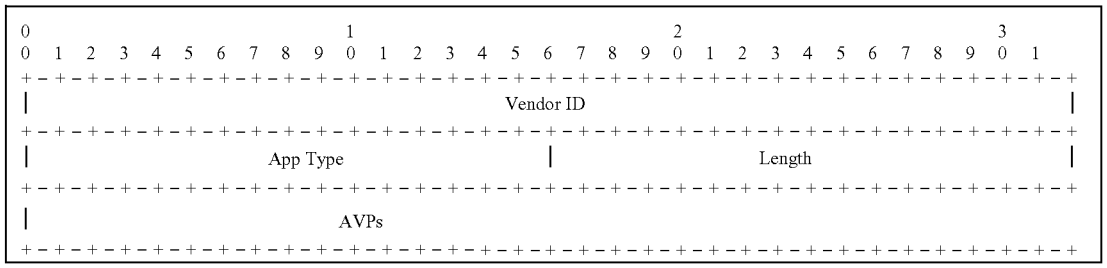

(length=0x08). In the posture validation request each VAF contains Attribute Value Pairs (AVPs) sent by the host and forwarded by the AAA server. The posture validation response contains VAFs corresponding to VAFs in the request. Each VAF in the response can contain an Application specific Posture Token (APT), an Action AVP and a list of proprietary AVPs. The VAF is forwarded to the host by the AAA server. The AAA server can add one or more AVPs to the VAF but it will not delete an AVP from the VAF. If an APT is included, the APT is located as the first AVP in the VAF (optimizing the search for the APT in the VAF). At least one APT is present in a valid VAF-TLV response.

The PVS follows the following processing rules. If no VAF exists in the request, the PVS returns a Result-TLV with value set to 0x0006. If not enough data exists in the VAFs either because codes are not recognized (vendor, application type or attribute) or information is missing the PVS can return a Result-TLV with value set to 0x0001 and a VAF-TLV with APT set to 'unknown'. If the Result-TLV value is set to 0x0001 "Success" then at least one VAF is present in the The Vendor ID field is a 32 bit field describing the vendor's public identification. The App Type field is a 16 bit field describing the application type. The Length field is a 16 bit field describing the overall length of the frame including the frame header and the total size of the AVPs. The AVPs field contains a set of AVPs.

An Attribute-Value Pair (AVP) is the basic data entity, containing the attribute code and the attribute data.

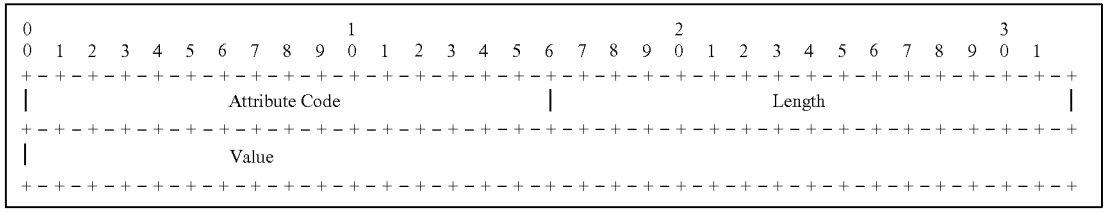

The Attribute Code field is a 16 bit field describing the attribute. The Length field is a 16 bit field describing the overall length of the AVP, including the AVP header and value. The Value field contains the actual value.

The Result TLV contains a code describing the result status that was requested by the AAA server. The Result TLV is be included all PVS posture validation responses to indicate the result status. The Result TLV has a Type of 2, a Length of 8 and a Value containing an unsigned integer. A value of 0x0001 indicates the operation was performed successfully and the response contains a valid VAF-TLV frame. A value of 0x0003 indicates the PVS is currently busy and can't perform the requested operation. Supporting this value depends on the implementation. A value of 0x0004 indicates the PVS does not support this type of request. A value of 0x0005 indicates the message could not be read by the PVS because the values in the field don't make sense. For example: if VAF length is larger than the TLV length or the TLV length is larger the message length. A value of 0x0006 indicates that there are no VAFs in the request. A value of 0x0008 indicates that the version is not supported by the PVS, if the AAA server supports other versions as well, the AAA server may decide to start version negotiation. A value of 0x00FF indicates a general error.

HCAP is encapsulated in HTTP messages. HTTP is an extensive protocol that provides many features. The encapsulation method described is the minimal set of HTTP features that are required in order to support the encapsulation of HCAP messages.

HCAP requests are encapsulated in HTTP requests. The AAA server uses the POST method for sending an HCAP requests. The HCAP request is an entity body. HCAP responses are encapsulated in the HTTP response. The HCAP response is an entity body.

When authentication is complete and the PVS sends a success code, the AAA server can continue sending HCAP messages encapsulated in HTTP requests.

The following HTTP error codes are supported: a code of 200 indicates "OK" and is used whenever the HTTP request is a valid request, a code of 400 indicates a bad request and is used whenever there is an error with the HTTP request, and a code of 401 indicates "Unauthorized" and is used whenever the PVS wishes.

HTTP messages are encapsulated within Secure Socket Layer (SSL) protocol. SSL is a protocol that provides both authentication and encryption. The AAA server expects the PVS to send a certificate, which the AAA server validates. The AAA server will not send any certificates to the PVS. The encrypted tunnel is created without authenticating the AAA server. If a PVS wishes to authenticate the AAA server, the PVS uses HTTP digest authentication.

Figure 2:
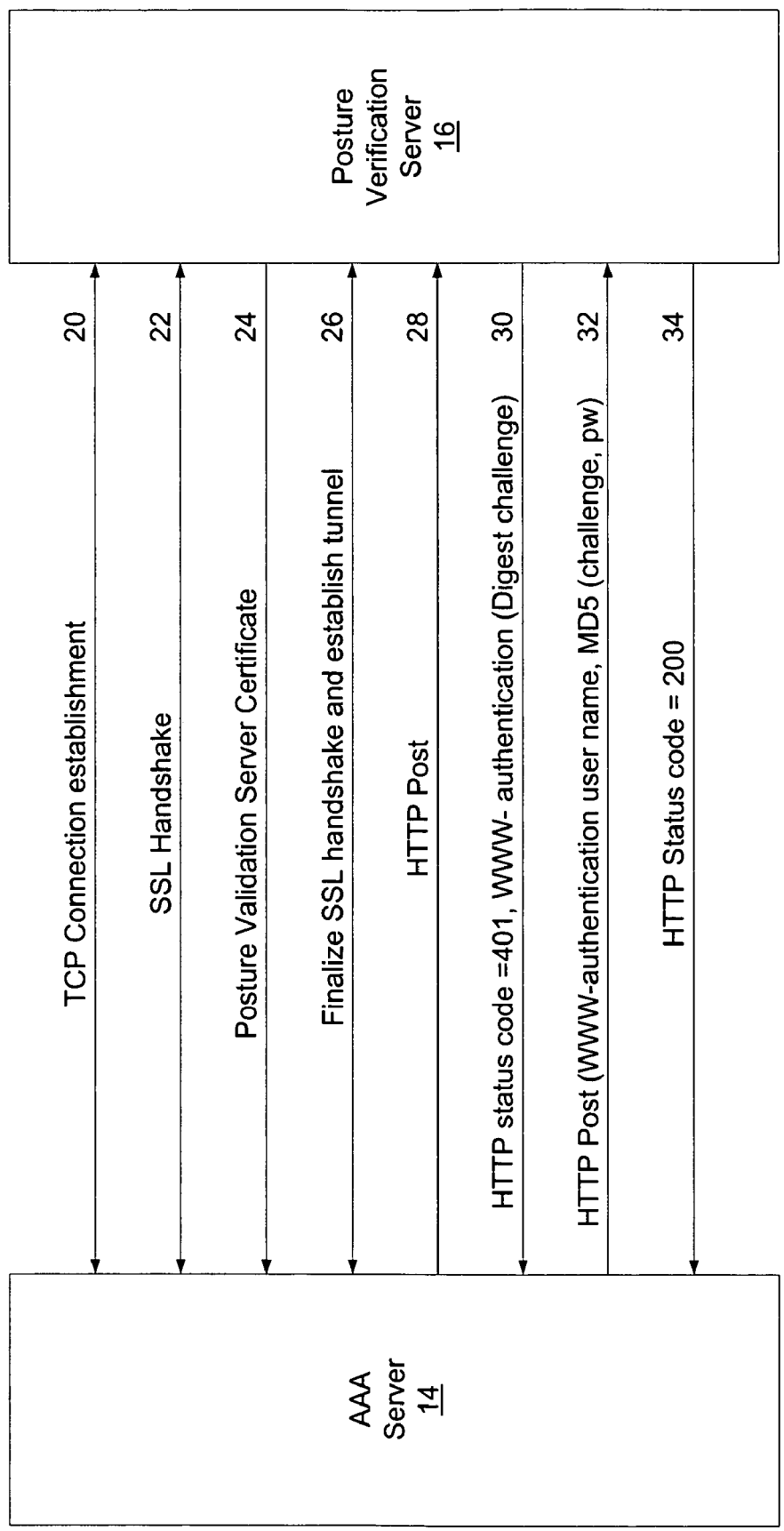
FIG. 2 is a diagram showing messages used in performing mutual authentication and connection establishment.

Referring now to FIG. 2, an example of the mutual authentication and connection establishment between the AAA server 14 and the PVS 16 is shown. A Terminal Control Protocol (TCP) connection 20 is established between the AAA server 14 and the PVS 16. An SSL handshake is performed between the AAA server 14 and PVS 16. Next, a posture validation server certificate 24 is transferred from PVS 16 to AAA server 14. The SSL handshake is finalized and a tunnel is established 26 between the AAA server 14 and PVS 16. This signifies the end of the connection establishment.

Mutual authentication then takes place between the AAA server 14 and the PVS 16. An HTTP Post message 28 is sent from the AAA server 14 to PVS 16. In response to the HTTP Post message, an HTTP message 30 is sent from PVS 16 to AAA server 14. This message 30 includes a status code of 401, and a www authentication digest challenge. In response to the message from the PVS 16, a message is sent from AAA server 14 to PVS 16. This message comprises n HTTP Post (WWW-authentication username, MD5 (challenge, password). The PVS responds with an HTTP message including a status code of 200.

Figure 3:
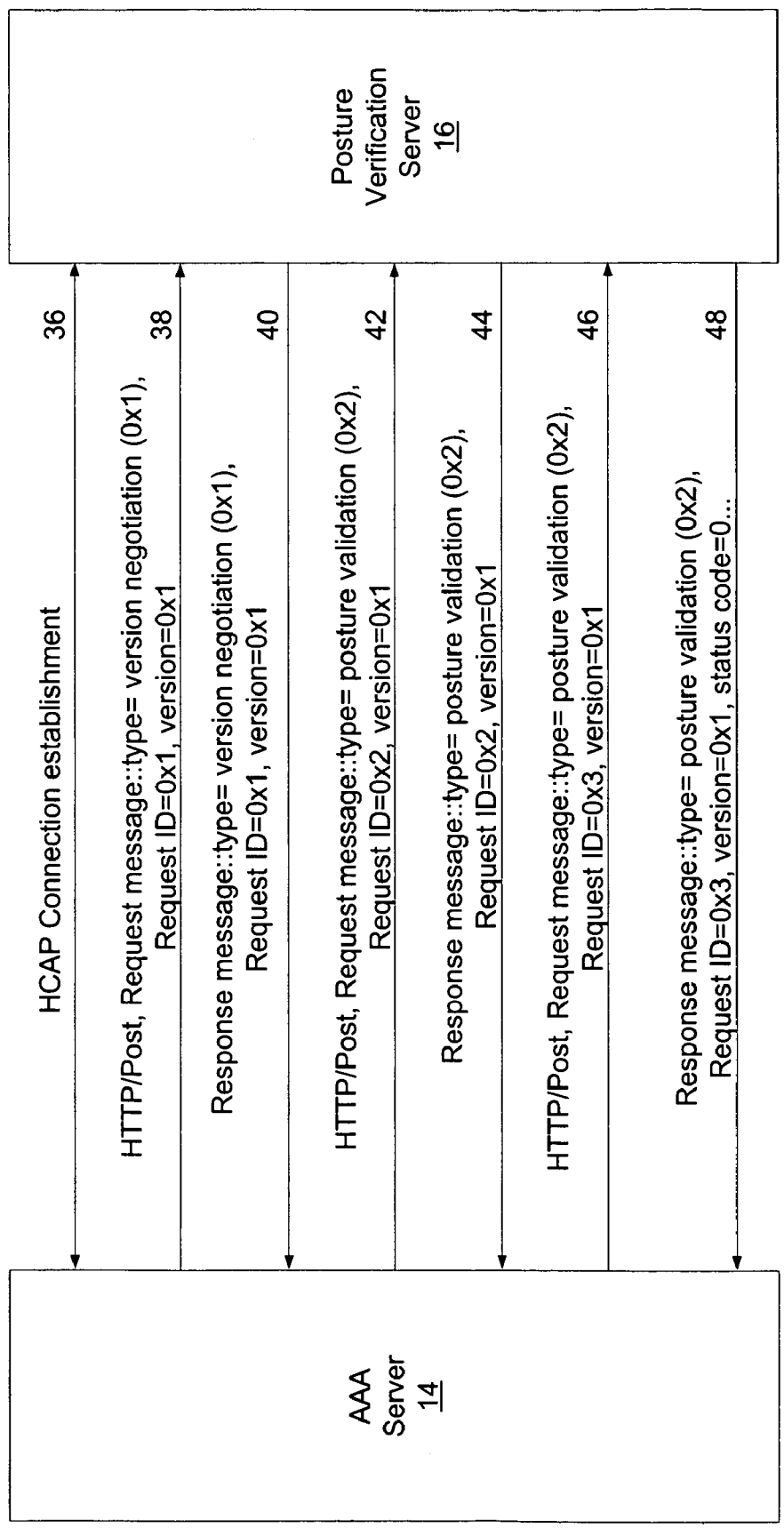
FIG. 3 is a diagram showing messages used in a single connection scenario.

Referring now to FIG. 3, an example of HCAP communications for establishing and using a single connection between the AAA server 14 and posture verification server 16 is shown. An HCAP connection establishment process 36 begins between the AAA server 14 and the PVS server 16. An HTTP/post 38 is sent from the AAA server 14 to the PVS 16. This message 38 includes a request message type of 0x1 (version negotiation), a request ID of 0x1 (the identification number for this message) and a version of 0x1 (indicating the version of the HCAP being negotiated). The posture verification server 16 then sends a response message 40 to the AAA server 14. The response message type is 1 (indicating version negotiation) a request ID of 1 (the identification number for this message) and a version of 1 (indicating the version of the HCAP being negotiated). After successful version negotiation the posture validation begins.

An HTTP request message 42 is sent from AAA server 14 to posture verification server 16. This message includes a message type of 2 (posture validation) a request ID of 2 (the identification number for this message) and a version of 1 (indicating the version of the HCAP that was negotiated). The posture verification server 16 sends a response message 44 to the AAA server 14. The response message type is also 2 (indicating posture validation) and includes a request ID of 2 (indicating the identification number for this message) and a version of 1. The AAA server 14 sends another HTTP Post Message to the PVS 16. This message also has a message type of 2 indicating posture validation. This message has a request ID of 3 (indicating that this is a different request than the prior request which has a request ID of 2). This message also has a version of 1. The posture verification server 16 sends back a posture validation message with a request ID of 3 indicating it is a response to the request having an ID of 3 and not for the request having an ID of 2. This message also has version value of 1 and includes a status code.

Posture validation request from a host are blocked until the HCAP implementation returns one of the following results: a valid response returned from PVS or from local policy evaluation, an error occurred, or a timeout occurred.

A single HCAP request is blocked until one of the following occurs: the PVS returned a valid HCAP response with success code, the PVS returned a valid HCAP response with a failure code, an error occurred, the connection was closed (can be closed by any layer—TCP, SSL, HTTP), or a timeout occurred. The timeout for a single HCAP request can have a different value than the timeout value of the entire Posture request.

Figure 4:
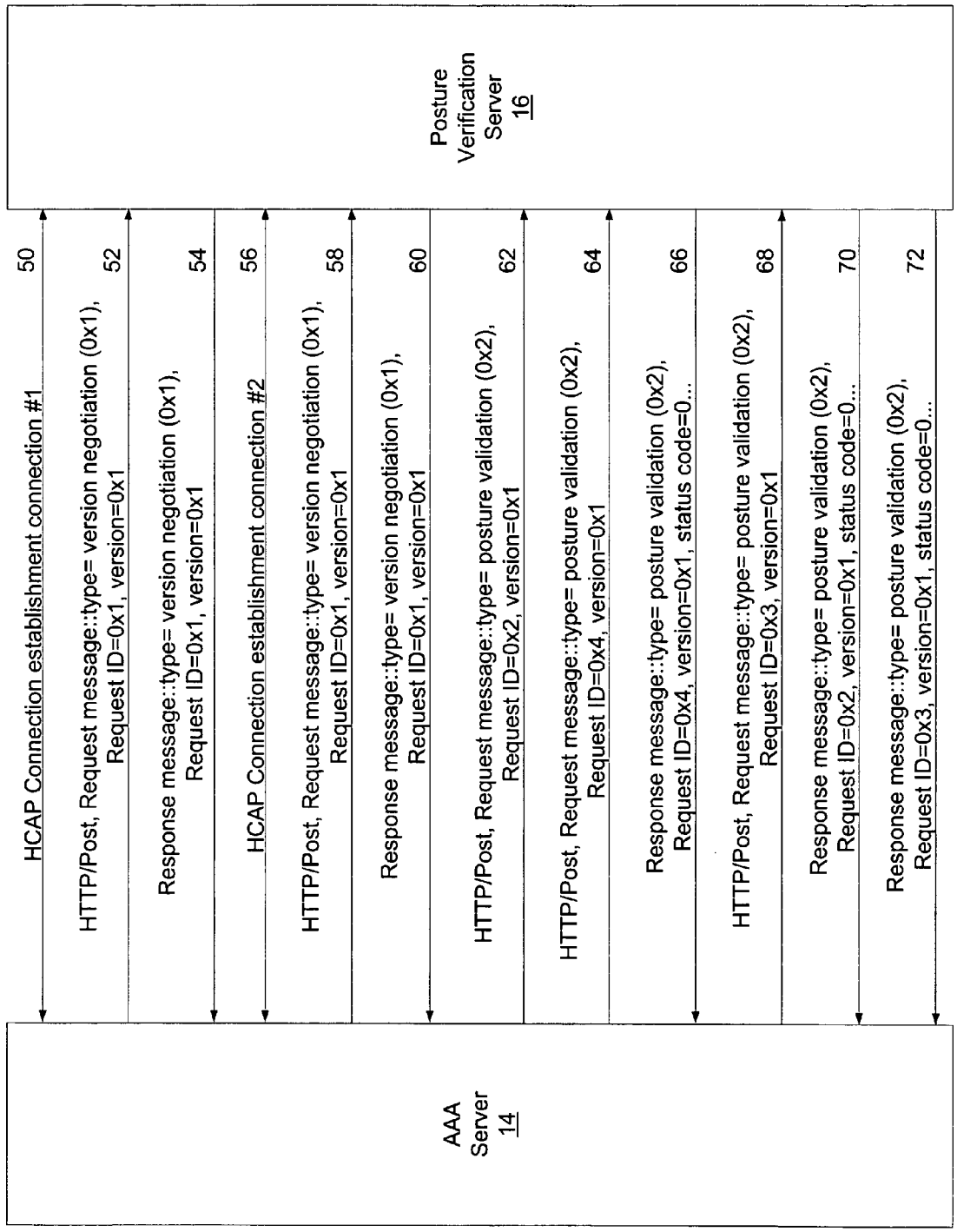
FIG. 4 is a diagram showing messages used in a multiple connection scenario.

Referring now to FIG. 4, an environment wherein the AAA server 14 has multiple connections to a PVS 16 is shown. A first HCAP connection 50 is established between the AAA server 14 and the PVS 16. An HTTP/post 52 is sent from the AAA server 14 to the PVS 16. This message 52 includes a request message type of 1 (version negotiation), a request ID of 1 (the identification number for this request) and a version of 1 (indicating the version of the HCAP being negotiated). The posture verification server 16 then sends a response message 54 to the AAA server 14. The response message type is 1 (indicating version negotiation) a request ID of 1 (the identification number for this response and indicating that this response is to the request having the same request ID number) and a version of 1 (indicating the version of the HCAP being negotiated).

A second HCAP connection 56 is established between the AAA server 14 and the PVS 16. An HTTP/post 58 is sent from the AAA server 14 to the PVS 16. This message 58 includes a request message type of 1 (version negotiation), a request ID of 1 (the identification number for this request) and a version of 1 (indicating the version of the HCAP being negotiated). The posture verification server 16 then sends a response message 60 to the AAA server 14. The response message type is 1 (indicating version negotiation) a request ID of 1 (the identification number for this response and indicating that this response is to the request having the same request ID number) and a version of 1 (indicating the version of the HCAP being negotiated).

An HTTP request message 62 is sent from AAA server 14 to posture verification server 16. This message 62 includes a message type of 2 (posture validation) a request ID of 2 (the identification number for this message) and a version of 1 (indicating the version of the HCAP that was negotiated).

An HTTP request message 64 is sent from AAA server 14 to posture verification server 16. This message 64 includes a message type of 2 (posture validation) a request ID of 4 (the identification number for this message) and a version of 1 (indicating the version of the HCAP that was negotiated).

The posture verification server 16 sends a response message 66 to the AAA server 14. The response message type is also 2 (indicating posture validation) and includes a request ID of 4 (indicating the identification number for this message) and a version of 1.

An HTTP request message 68 is sent from AAA server 14 to posture verification server 16. This message includes a message type of 2 (posture validation) a request ID of 3 (the identification number for this message) and a version of 1 (indicating the version of the HCAP that was negotiated).

The posture verification server 16 sends a response message 70 to the AAA server 14. The response message type is also 2 (indicating posture validation) and includes a request ID of 2 (indicating the identification number for this message) and a version of 1.

The posture verification server 16 sends a response message 72 to the AAA server 14. The response message type is also 2 (indicating posture validation) and includes a request ID of 3 (indicating the identification number for this message) and a version of 1.

Figure 5A:
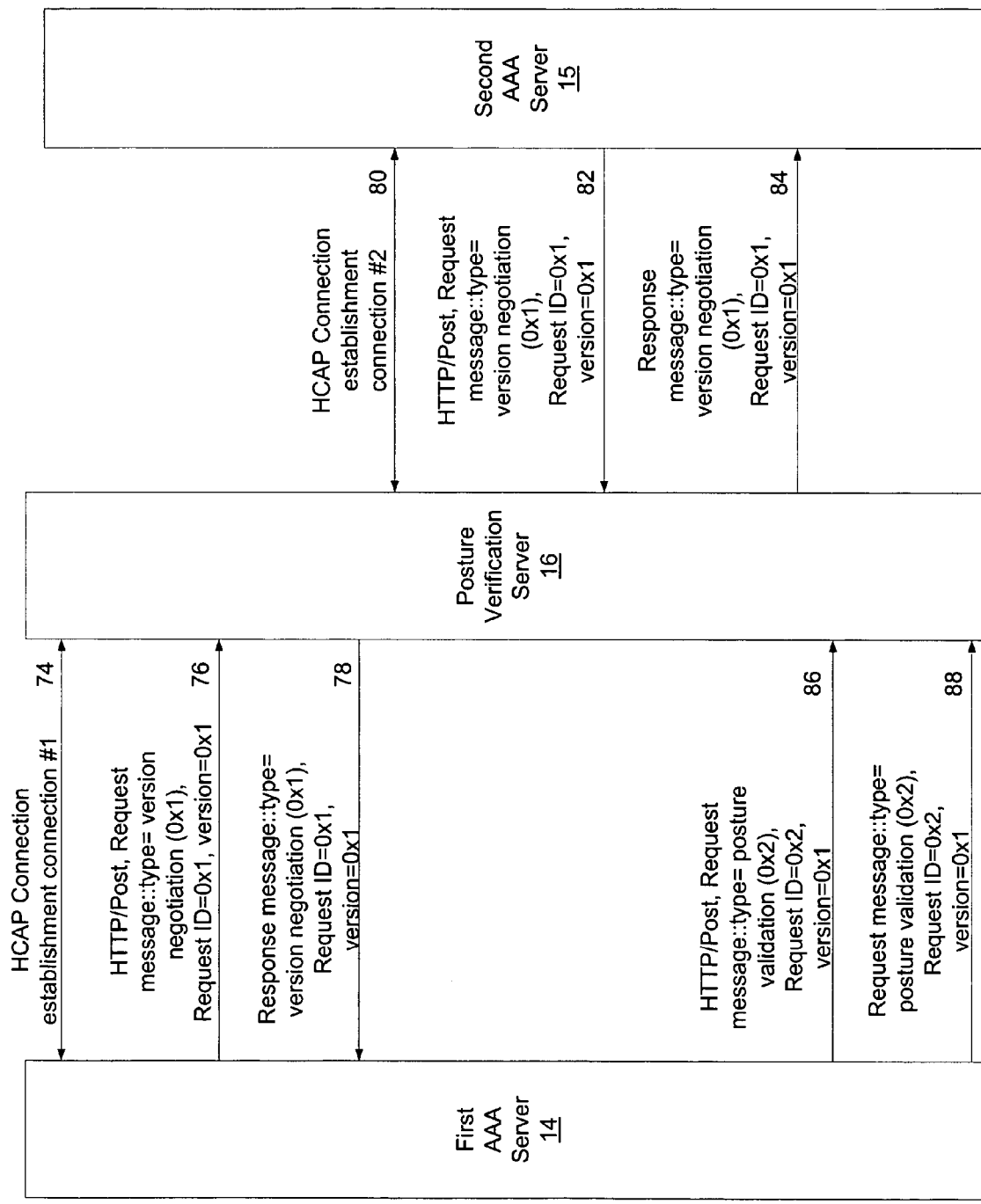
FIGS. 5A and 5B are diagrams showing messages used in a multiple AAA server/single posture validation server scenario.
Figure 5B:
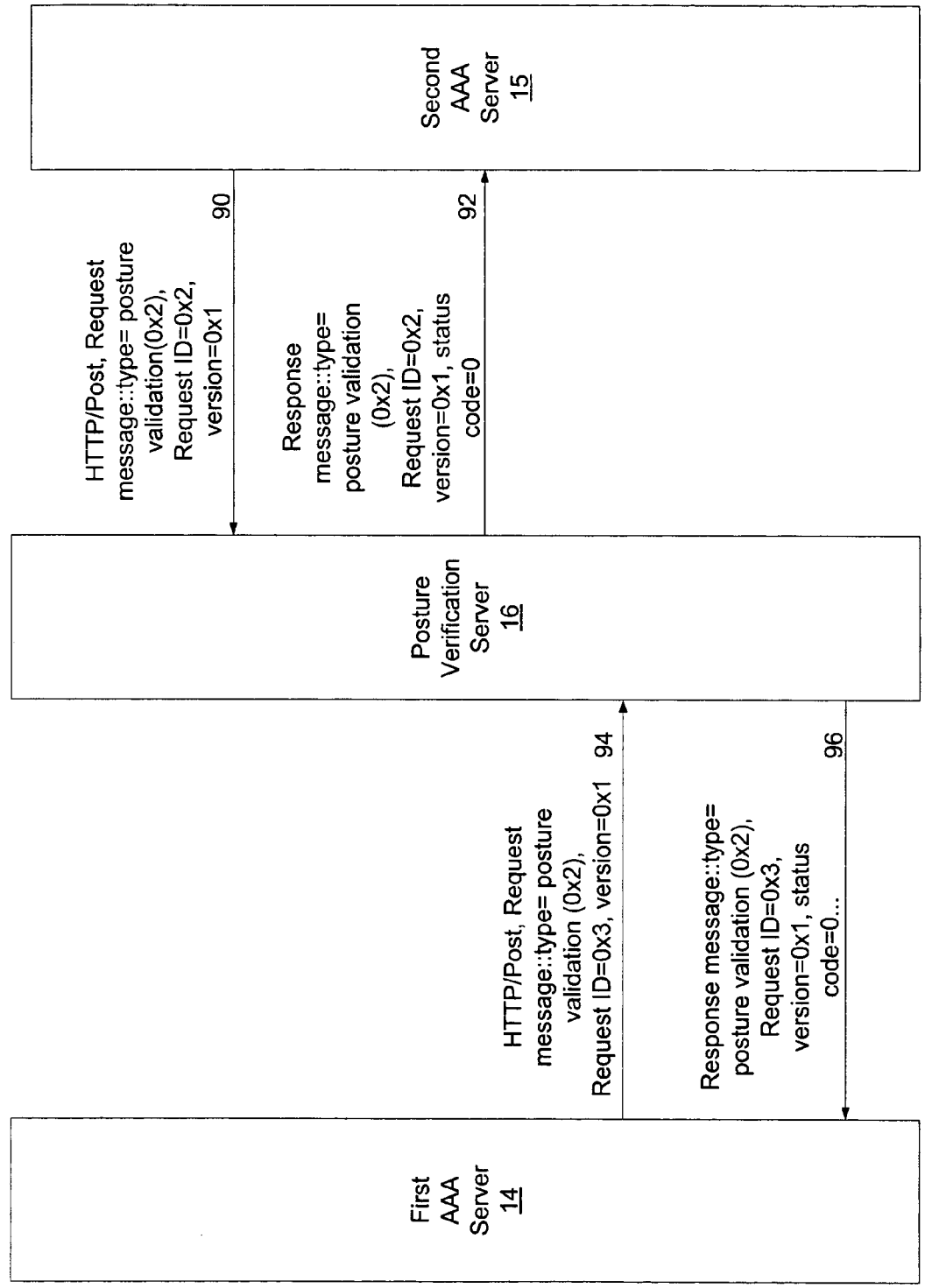

Referring now to FIG. 5A, an environment wherein multiple AAA servers 14 and 15 make connections to a PVS 16 is shown. A first HCAP connection 74 is established between the first AAA server 14 and the PVS 16. An HTTP/post 76 is sent from the first AAA server 14 to the PVS 16. This message 74 includes a request message type of 1 (version negotiation), a request ID of 1 (the identification number for this request) and a version of 1 (indicating the version of the HCAP being negotiated). The posture verification server 16 then sends a response message 78 to the first AAA server 14. The response message type is 1 (indicating version negotiation) a request ID of 1 (the identification number for this response and indicating that this response is to the request having the same request ID number) and a version of 1 (indicating the version of the HCAP being negotiated).

A second HCAP connection 56 is established between the second AAA server 15 and the PVS 16. An HTTP/post 82 is sent from the second AAA server 15 to the PVS 16. This message 82 includes a request message type of 1 (version negotiation), a request ID of 1 (the identification number for this request) and a version of 1 (indicating the version of the HCAP being negotiated). The posture verification server 16 then sends a response message 84 to the second AAA server 15. The response message type is 1 (indicating version negotiation) a request ID of 1 (the identification number for this response and indicating that this response is to the request having the same request ID number) and a version of 1 (indicating the version of the HCAP being negotiated).

An HTTP request message 86 is sent from first AAA server 14 to posture verification server 16. This message includes a message type of 2 (posture validation) a request ID of 2 (the identification number for this message) and a version of 1 (indicating the version of the HCAP that was negotiated). The posture verification server 16 sends a response message 88 to the first AAA server 14. The response message type is also 2 (indicating posture validation) and includes a request ID of 2 (indicating the identification number for this message) and a version of 1.

An HTTP request message 90 is sent from second AAA server 15 to posture verification server 16. This message includes a message type of 2 (posture validation) a request ID of 2 (the identification number for this message) and a version of 1 (indicating the version of the HCAP that was negotiated). The posture verification server 16 sends a response message 92 to the second AAA server 15. The response message type is also 2 (indicating posture validation) and includes a request ID of 2 (indicating the identification number for this message) and a version of 1.

An HTTP request message 94 is sent from first AAA server 14 to posture verification server 16. This message includes a message type of 2 (posture validation) a request ID of 3 (the identification number for this message) and a version of 1 (indicating the version of the HCAP that was negotiated). The posture verification server 16 sends a response message 96 to the first AAA server 14. The response message type is also 2 (indicating posture validation) and includes a request ID of 3 (indicating the identification number for this message) and a version of 1.

Figure 6:
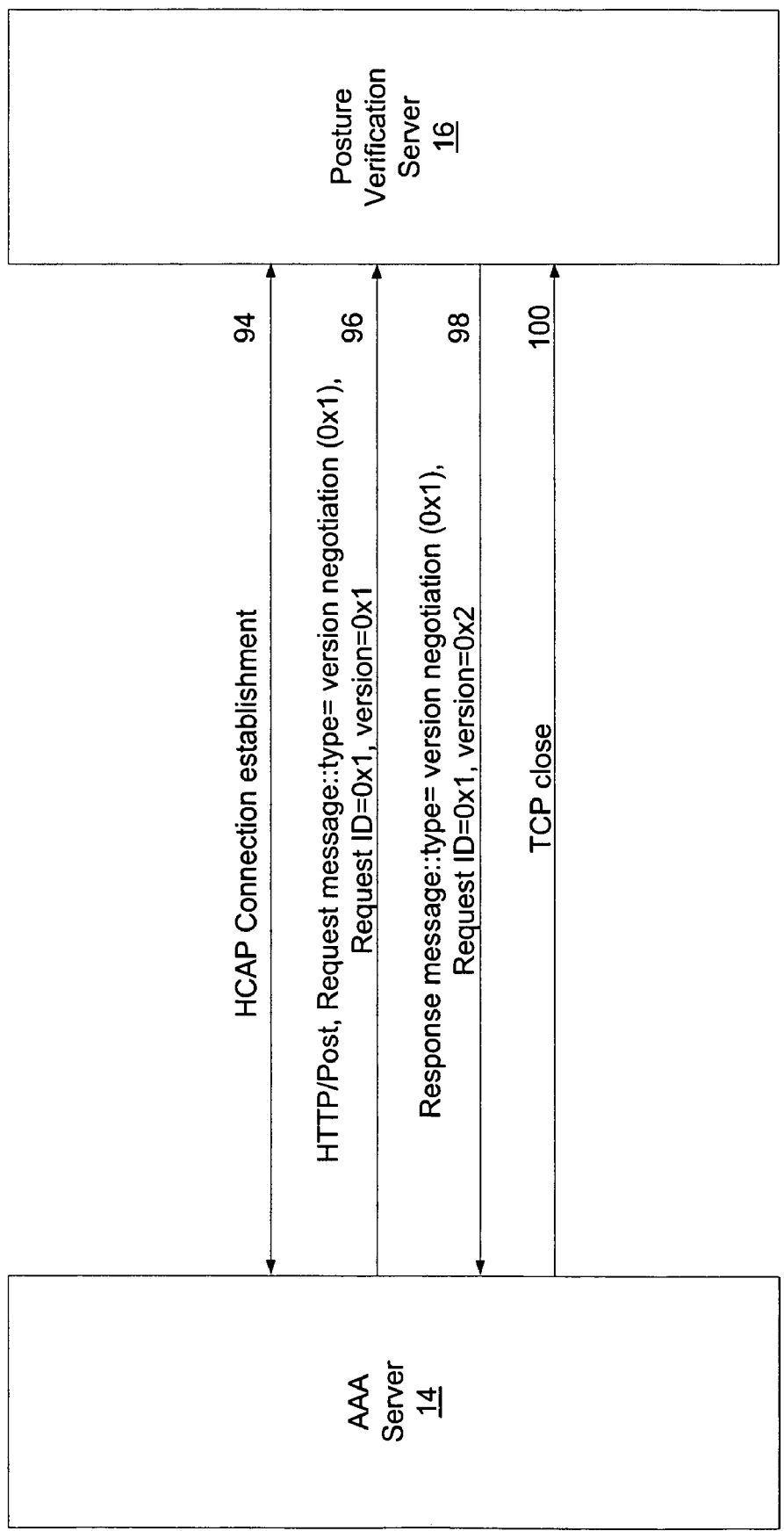
FIG. 6 is a diagram showing messages used in a failed negotiation.

Referring now to FIG. 6, there may be in instance where a version negotiation fails. In FIG. 6 an HCAP connection establishment process 98 begins between AAA server 14 and posture verification server 16. An HTTP request message 100 is sent from AAA server 14 to posture verification server 16. This message includes a message type of (version negotiation) a request ID of 1 (the identification number for this message) and a version of 1 (indicating the version of the HCAP that is being negotiated). The posture verification server 16 sends a response message 102 to the AAA server 14. The response message type is also 1 (indicating version negotiation) and includes a request ID of 1 (indicating the identification number for this message) and a version of 2. The AAA server 14 in response to the response message having a different version number than the request message, closes the TCP connection 100.

To handle failover scenarios an AAA server can be configured to communicate with more than one PVS. A fail over scenario happens when an HCAP request fails for different reasons. An AAA server may be configured to handle failover cases in different manners, as described in the following sections.

The following describes the failover operation assuming that both the primary and the secondary PVSs are configured, as well as a local policy for validating posture. The AAA server sends an HCAP request to the primary server. If the connection to the primary PVS was closed, an error occurred or a timeout occurred then the AAA server send the same HCAP message to the secondary server (it must not be assume that the ID of the request sent to the primary server is the same to the ID of the request sent to the secondary server). Otherwise the operation returns the valid response. If the connection to the secondary PVS was closed, an error occurred or a timeout occurred then the AAA server validates the posture locally, otherwise the operation returns the valid response. If an error occurred the operation return an error code, otherwise the operation returns a valid response. During the operation a timeout for the entire posture validation can occur. In this case the operation returns an error with timeout code.

Figure 7:
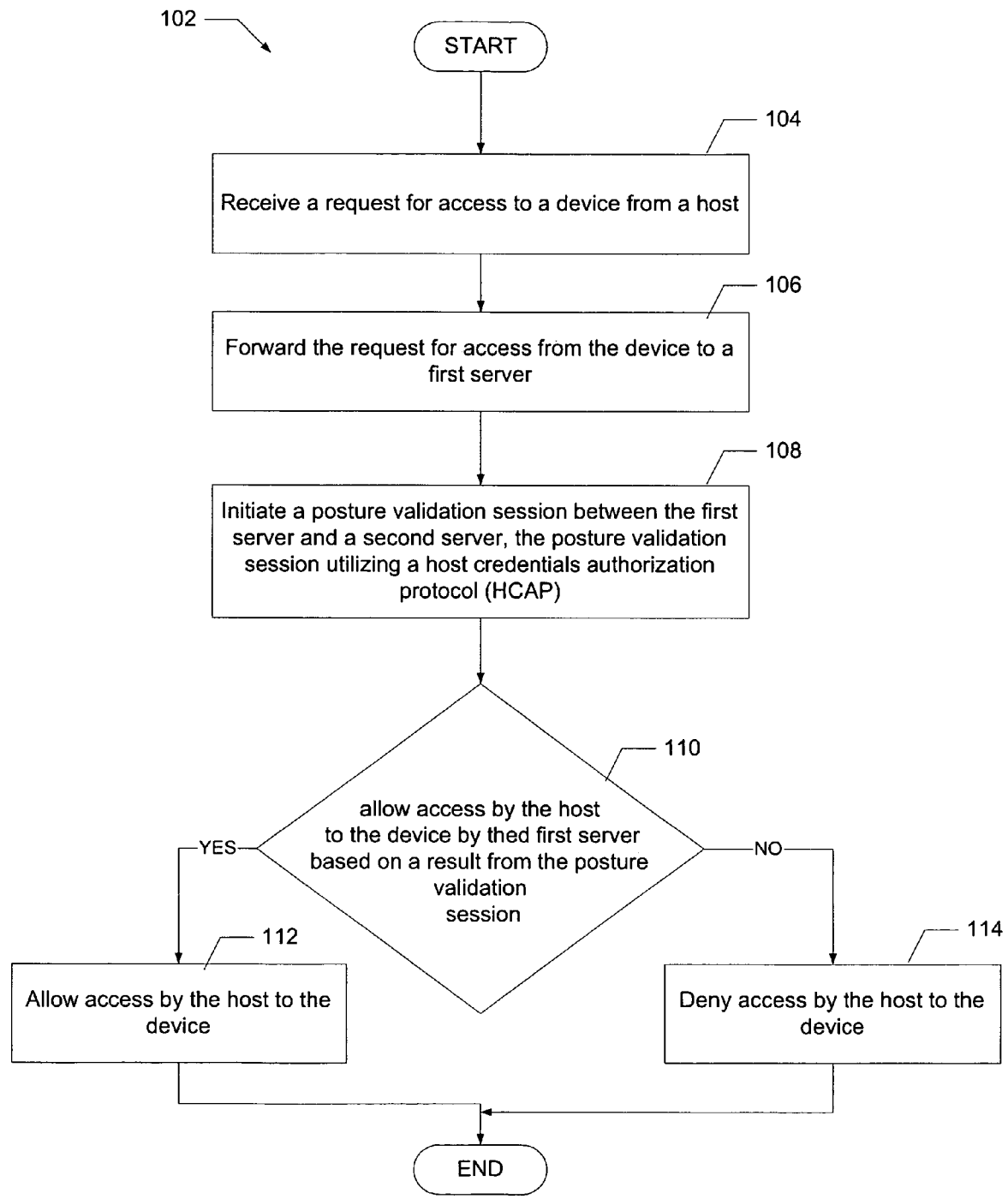
FIG. 7 is a flowchart of a method of performing host credential authorization.

A flow chart of the presently disclosed method is depicted in FIG. 7. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 7, the method 110 starts and processing block 112 is executed. In processing block 112 a request for access to a device from a host is received.

Processing block 114 recites that a request for access is forwarded from the device to a first server. The first server may be any AAA server or similar such device.

Processing block 116 discloses that a posture validation session is initiated between the first server in a second server. The posture validation session utilizes a host credentials authorization protocol (HCAP). The second server may be a posture validation server such as, for example, an antivirus server.

Decision block 118 states that a determination is made whether to allow access by the host to the device. The decision is made by the first server and is based on a result from the posture validation session.

When the determination from decision block 118 is to allow access, then processing block 120 is executed. Processing block 120 recites that the device is allowed access by the host. Following execution of processing block 120 the process ends.

When the determination from decision block 118 is not to allow access, processing continues with processing block 122. Processing block 122 discloses that access by the host to the device is denied. Following execution of processing block 122 the process ends.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or as executable code within the memory system (e.g., within random access memory or RAM). It is also to be understood that other embodiments of the invention can provide the applications operating within the processor as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for controlling access to a device, the method comprising:

receiving a request for access to the device from a host, wherein the request for access includes host credentials describing a state of the host with respect to its execution of an anti-virus application;

forwarding the request for access from said device to a first server;

initiating a posture validation session between an authentication, authorization and accounting (AAA) server and a posture validation server, said posture validation session utilizing a host credentials authorization protocol (HCAP);

the posture validation server being operated by an application vendor that provides the anti-virus application executed by the host and is utilized to enforce a network access policy requiring a virus scan of the host with the anti-virus application within a predetermined preceding period;

determining whether to allow access by said host to said device by said first server based on a result from said posture validation session, wherein the determining whether to allow access includes:

creating, from the host credentials, one or more attribute-value pairs each containing an attribute and a value of the attribute, each attribute-value pair conveying information pertaining to the state of the host with respect to its execution of the anti-virus application;

creating a posture validation request message and sending the posture validation request message to the posture validation server, the posture validation request message including a Vendor AppType frame including (i) a vendor identifier identifying the vendor, (ii) an application type field describing an anti-virus application type, and (iii) the attribute value pairs created from the host credentials;

receiving a posture validation response message from the posture validation server, the posture validation response message including a result for the posture validation request message, the result providing information pertaining to whether the host is in compliance with the network access policy; and determining, based on the result in the posture validation response message, whether the host is in compliance with the network access policy; and when it is determined that access is allowed, allowing access by said host to said device; and when it is determined that access is not allowed, disabling access by said host to said device.

2. The method of claim 1 wherein said HCAP includes a version negotiation request message, a version negotiation response message, the posture validation request message, and the posture validation response message.

3. The method of claim 2 wherein said version negotiation request message, said version negotiation response message, said posture validation request message, and said posture validation response message are in a format comprising a code field, a request ID field, a length field, a type field, a flags field, a version field and a data field.

4. The method of claim 3 wherein said code field comprises an eight bit field indicating the message is one of a request message and a response message.

5. The method of claim 3 wherein said request ID field comprises a sixteen bit field indicating an identification number for a request.

6. The method of claim 3 wherein said length field comprises a sixteen bit field indicating a number of octets in the message.

7. The method of claim 3 wherein said type field comprises an eight bit field indicating a message type.

8. The method of claim 3 wherein said flag field comprises an eight bit field.

9. The method of claim 3 wherein said version field comprises an eight bit field indicating the version of the HCAP.

10. The method of claim 1 wherein:
the result in the posture validation response message includes (i) a result value indicating whether or not the posture validation server was able to successfully process the posture validation request, and (ii) a response VendorAppType frame (response VAF) if the posture validation server was able to successfully process the posture validation request, the response VAF including an application-specific posture token (APT) including the information pertaining to whether the host is in compliance with the network access policy; and
determining whether the host is in compliance with the network access policy comprises processing the result to determine (iii) whether the result value indicates that the posture validation server was able to successfully process the posture validation request, and (iv) whether the response VAF includes the APT.

11. A system comprising:
a host;
a device in communication with said host;
an authentication, authorization and accounting (AAA) server in communication with said device; and
a posture validation server (PVS) in communication with said AAA server, said PVS communicating with said AAA server using a host credentials authorization protocol (HCAP);
the PVS being operated by an application vendor that provides an anti-virus application executed by the host and is utilized to enforce a network access policy requiring a virus scan of the host with the anti-virus application within a predetermined preceding period;
said AAA server and said PVS determine whether said host is allowed access to said device, wherein as part of determining whether the host is allowed access to the device, the AAA server:
receives from the device a request for access including host credentials describing a state of the host with respect to its execution of the anti-virus application;
creates, from the host credentials, one or more attribute-value pairs each containing an attribute and a value of the attribute, each attribute-value pair conveying information pertaining to the state of the host with respect to its execution of the anti-virus application;
creates a posture validation request message and sends the posture validation request message to the PVS, the posture validation request message including a Vendor AppType frame including (i) a vendor identifier identifying the vendor, (ii) an application type field describing an anti-virus application type, and (iii) the attribute-value pairs created from the host credentials;
receives a posture validation response message from the PVS, the posture validation response message including a result for the posture validation request message, the result providing information pertaining to whether the host is in compliance with the network access policy; and
determines, based on the result in the posture validation response message, whether the host is in compliance with the network access policy.

12. The system of claim 11 wherein said HCAP includes the posture validation request message, the posture validation response message, a version negotiation request message and a version negotiation response message.

13. The system of claim 12 wherein said posture validation request message, said posture validation response message, said version negotiation request message and said version negotiation response message are in a format comprising a code field, a request ID field, a length field, a type field, a flags field, a version field and a data field.

14. The system of claim 11, wherein:
the result in the posture validation response message includes (i) a result value indicating whether or not the posture validation server was able to successfully process the posture validation request, and (ii) a response VendorAppType frame (response VAF) if the posture validation server was able to successfully process the posture validation request, the response VAF including an application-specific posture token (APT) including the information pertaining to whether the host is in compliance with the network access policy; and
the AAA server is operative, when determining whether the host is in compliance with the network access policy, to process the result to determine (iii) whether the result value indicates that the posture validation server was able to successfully process the posture validation request, and (iv) whether the response VAF includes the APT.

15. A system comprising:
means for receiving a request for access to a device from a host;
means for forwarding the request for access from said device to an authentication, authorization and accounting (AAA) server;
means for initiating a posture validation session between said AAA server and a posture validation server, said posture validation session utilizing a host credentials authorization protocol (HCAP);
the posture validation server being operated by an application vendor that provides the anti-virus application executed by the host and is utilized to enforce a network access policy requiring a virus scan of the host with the anti-virus application within a predetermined preceding period;
means for determining whether to allow access by said host to said device by said AAA server based on a result from said posture validation session, wherein the determining means includes:
means for receiving from the device the request for access including host credentials describing a state of the host with respect to its execution of the anti-virus application;
means for creating, from the host credentials, one or more attribute-value pairs each containing an attribute and a value of the attribute, each attribute-value pair conveying information pertaining to the state of the host with respect to its execution of the anti-virus application;
means for creating a posture validation request message and sending the posture validation request message to the posture validation server, the posture validation request message including a Vendor AppType frame including (i) a vendor identifier identifying the vendor, (ii) an application type field describing an antivirus application type, and (iii) the attribute value pairs created from the host credentials;

means for receiving a posture validation response message from the posture validation server, the posture validation response message including a result for the posture validation request message, the result providing information pertaining to whether the host is in compliance with the network access policy; and means for determining, based on the result in the posture validation response message, whether the host is in compliance with the network access policy;

when it is determined that access is allowed, means for allowing access by said host to said device; and when it is determined that access is not allowed, means for disabling access by said host to said device.

* * * * *